Feb. 22, 1938.  W. T. HERNDON  2,109,173
WAVE MOTOR
Filed Feb. 16, 1937  2 Sheets-Sheet 2
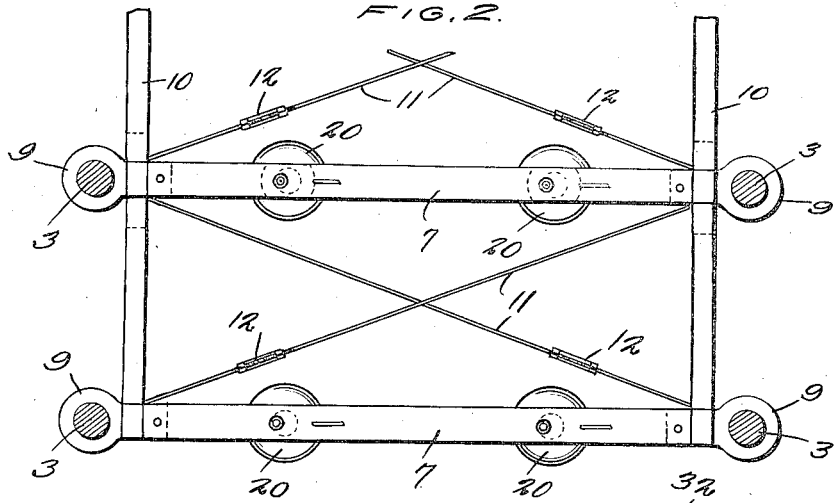
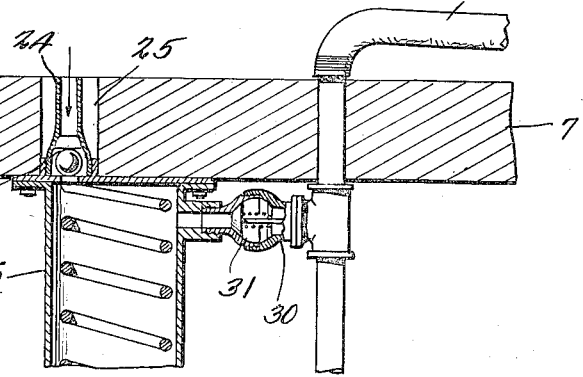
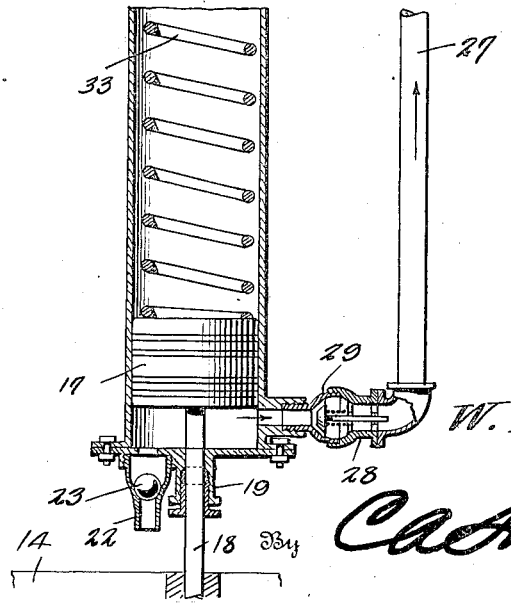

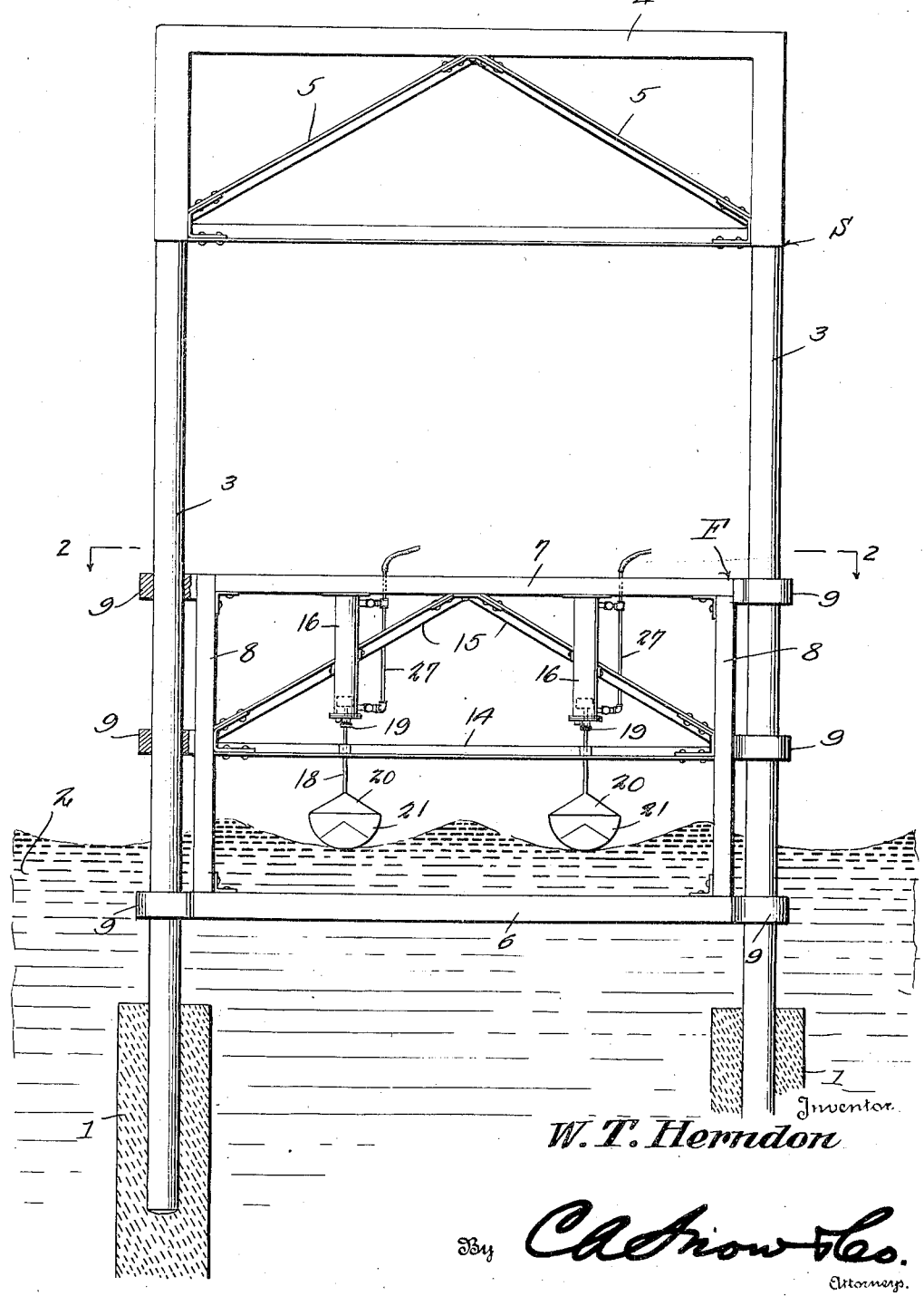

Patented Feb. 22, 1938

2,109,173

UNITED STATES PATENT OFFICE

2,109,173

WAVE MOTOR

William T. Herndon, Fayetteville, N. C., assignor of one-third to E. M. Blackwood and one-third to Thomas McInnis, both of Fayetteville, N. C.

Application February 16, 1937, Serial No. 126,078

3 Claims. (Cl. 230—67)

This invention aims to provide a simple but effective means whereby fluid pressure, preferably air pressure, may be created by the movements of the waves of a body of water.

The invention aims to provide novel means whereby the device is mounted in a stable manner, and to provide novel means whereby the air which is subjected to pressure is admitted to the cylinders and ejected from the cylinders.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in elevation, a device constructed in accordance with the invention;

Fig. 2 is a transverse section on the line 2—2 of Fig. 1;

Fig. 3 is a vertical longitudinal section taken through one of the cylinders and attendant parts, portions remaining in elevation.

In carrying out the invention there is provided a support which, as a whole, is marked by the letter S. The support S may include concrete piles 1 located in the earth at the bottom of a body of water 2, and constituting a foundation, the body of water being subjected to wave action. Vertical guide posts 3 are secured at their lower ends in the piles 1 and are arranged in pairs, the members of the pairs being disposed opposite to each other. The posts 3 of each pair are connected at their upper ends by a substantially rectangular top frame 4, reenforced by diagonal braces 5 diverging from the intermediate portion of the upper member of the frame 4 to the lower corners of the frame, as clearly shown in Fig. 1 of the drawings.

The letter F designates a frame mounted for vertical reciprocation on the posts 3. The frame F includes lower pontoons 6 submerged to some extent in the body 2 of water, a top member 7, and vertical struts 8 connecting the pontoons 6 with the top member 7 adjacent to the posts 3. The ends of the pontoons 6, the intermediate portions of the vertical struts 8, and the ends of the top member 7 are supplied with eyes 9, mounted to slide on the guide posts 3. There may be any desired number of the top members 7, as Fig. 2 will show, and the members 7 are joined by parallel top pieces 10. Between each pair of the top members 7, as shown in Fig. 2, the top pieces 10 are connected by diagonal, crossed ties 11, wherein turn buckles 12 or other tightening devices are interposed.

Each pair of vertical struts 8 is connected by a horizontal cross piece 14, and inclined braces 15 extend from the ends of the cross piece 14 to the intermediate portion of the corresponding top member or beam 7, as Fig. 1 will show.

Depending cylinders 16 are secured at their upper ends to each top beam 7. There may be any desired number of cylinders for each top beam. As shown in the drawings, but not of necessity, each top piece 7 carries two cylinders 16. In the cylinders 16, pistons 17 are mounted for reciprocation. Piston rods 18 are connected to the pistons 17 and slide in the cross piece 14. The piston rods 18 also reciprocate in glands 19 carried by the lower ends of the cylinders 16. To the lower ends of the piston rods 18, floats 20 are connected. The bottom portions of the floats 20 preferably are semispherical in form, so that they may receive the action of the waves, regardless of the direction in which the waves are flowing. The lower portions of the floats 20 are marked by the numeral 21.

In its lower end, each cylinder 16 has an air inlet 22. The air inlet 22 is controlled by an outwardly closing check valve 23. An inlet 24 is connected to the upper end of each cylinder 16. The inlet 24 is located in an opening 25 in the top beam 7. The inlet 24 is controlled by an outwardly closing check valve 26.

A pressure conducting pipe 27 is arranged parallel to each cylinder 16 and extends upwardly through the corresponding top beam 7. The pressure pipe 27 has a lower lateral branch 28, communicating with the cylinder 16 at a point near to the lower end of the said cylinder. In the branch 28, an outwardly opening check valve 29 is mounted. The pressure conducting pipe 27 has an upper lateral branch 30, which communicates with the cylinder 16 at a place near to the upper end of the said cylinder. In the lateral branch 30, an outwardly opening check valve 31 is mounted. A flexible tube 32 is assembled with the upper end of each pipe 27, so that pressure created by the operation of the machine may be conducted away to the place of use. In each cylinder 16, a compression spring 33 is mounted. The compression spring 33 bears at one end against the upper head of the cylinder 16, and bears at its lower end against the piston 17.

In practical operation, the pontoons 6 keep the frame F at such a height that the floats 20 will cooperate properly with the waves of the body 2 of water, the frame F having an automatic adjustment, responsive to the pontoons 6, upwardly and downwardly on the guide posts 3. The waves of the body 2 of water, acting on the floats 20, impart reciprocation to the piston rods 18 and to the pistons 17.

As the piston 17 moves upwardly, the check valve 29 closes, the check valve 23 opens, and air is drawn through the lower inlet 22, into the cylinder 16, below the piston 17. On the downstroke of the piston 17, the check valve 23 closes, the check valve 29 opens, and air under pressure is forced through the pipe 27 and the tube 32.

On the downstroke of the piston 17, the check valve 26 opens, and air is drawn through the inlet 24, into the upper portion of the cylinder 16, above the piston 17. On the upstroke of the piston 17, the check valve 26 closes, the check valve 31 opens, and air is forced into the upper portion of the pipe 27 and through the tube 32.

The spring 33 creates a quick downward movement of the piston 17, and keeps the float 20 at all times engaged with the waves of the body 2 of water. The strength of the spring 33, however, is not so great that it cannot be overcome by the upward thrust of the waves on the float 20.

Having thus described the invention, what is claimed is:

1. In a device of the class described, a support, a frame mounted directly on the support for vertical sliding movement and including a pontoon mounted on the support for vertical sliding movement, a cylinder fixed to the frame, a piston slidable in the cylinder, a piston rod connected to the piston, a float secured to the piston and responsive to the waves of a body of water, air inlet means for the cylinder, and an air outlet for the cylinder, through which the air passes under pressure, responsive to the movement of the piston.

2. In a device of the class described, a support, a frame on the support, a cylinder carried by the frame, a piston operating in the cylinder, a float responsive to the waves of a body of water, means for connecting the float to the piston, air inlet means for the cylinder, an air outlet for the cylinder, through which air passes under pressure, responsive to the movement of the piston, and spring means for moving the piston toward the pontoon, thereby to adjust the relative vertical positions of the float and the pontoon and to keep the float engaged with the waves.

3. In a device of the class described, a foundation, horizontally spaced posts having their lower ends mounted on the foundation, a frame comprising a top bar, an intermediate bar and a lower pontoon, all having their ends slidably mounted on the posts, struts connecting the top bar, the intermediate bar and the pontoon, depending cylinders having their upper ends secured to the top bar, inlet and outlet means for the cylinders, pistons slidable in the cylinders, piston rods connected to the pistons and guided in the intermediate bar, and floats secured to the lower ends of the piston rods and located between the intermediate bar and the pontoon.

WILLIAM T. HERNDON.